Patented Jan. 13, 1925.

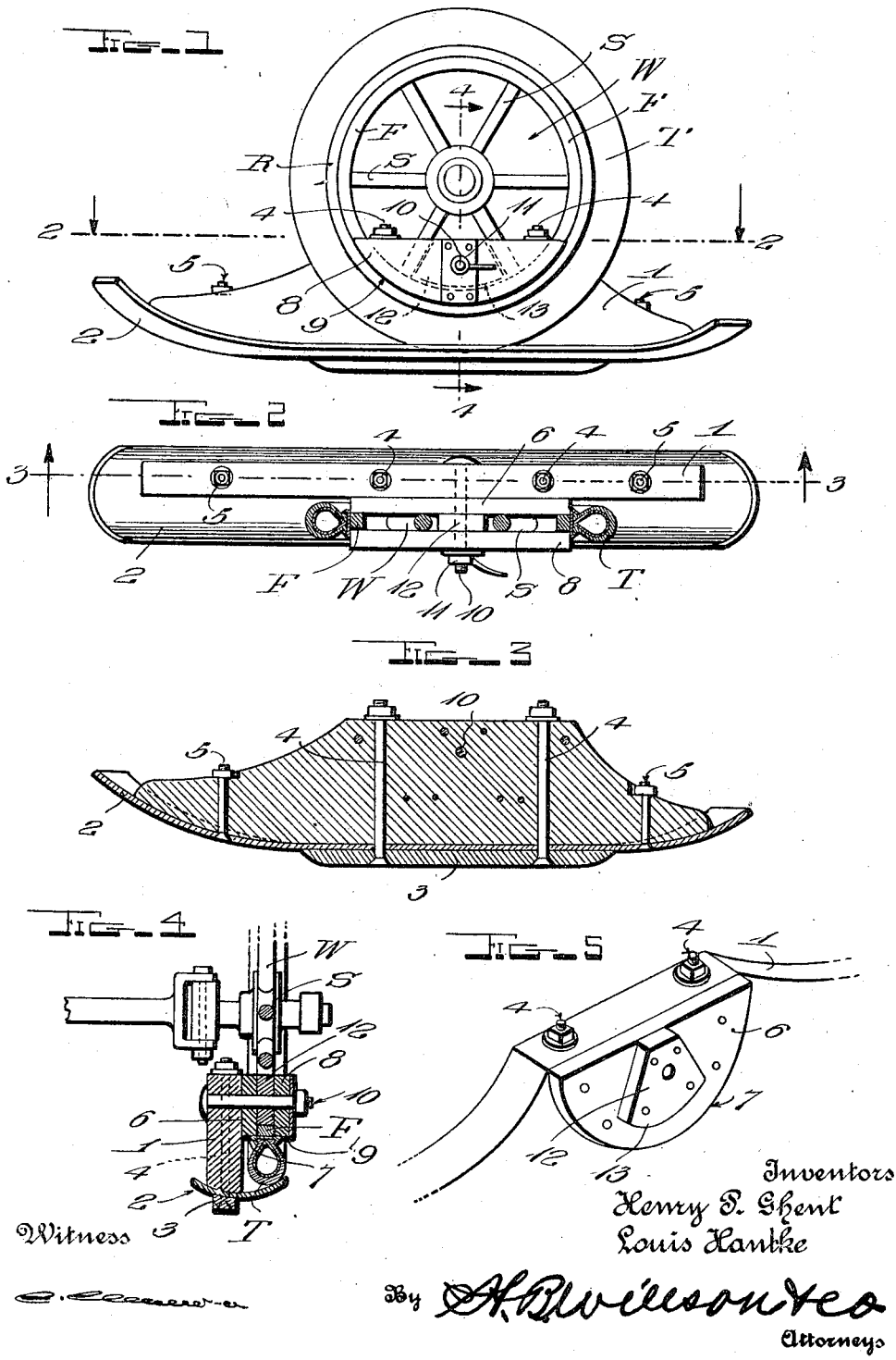

1,522,816

UNITED STATES PATENT OFFICE.

HENRY PAUL GHENT AND LOUIS HANTKE, OF NEILLSVILLE, WISCONSIN.

RUNNER ATTACHMENT FOR AUTOMOBILES.

Application filed May 19, 1924. Serial No. 714,427.

*To all whom it may concern:*

Be it known that we, HENRY P. GHENT and LOUIS HANTKE, citizens of the United States, residing at Neillsville, in the county of Clark and State of Wisconsin, have invented certain new and useful Improvements in Runner Attachments for Automobiles; and we do declare the following to be a full, clear, and exact description of the invention, such as will enable others skilled in the art to which it appertains to make and use the same.

Our invention relates to new and useful improvements in runners adapted to be attached to the front wheels of automobiles, and our object is to provide a simple and inexpensive device of this character provided with unique means for securing it to an automobile wheel, in such manner that it may be quickly and easily applied or detached.

With the foregoing in view, the invention resides in the novel subject matter hereinafter described and claimed, the description being supplemented by the accompanying drawing.

Figure 1 is a side elevation.

Figure 2 is a horizontal sectional view as indicated by line 2—2 of Fig. 1.

Figure 3 is a vertical sectional view cut longitudinally, as indicated by line 3—3 of Fig. 2.

Figure 4 is a vertical transverse sectional view on line 4—4 of Fig. 1.

Figure 5 is a fragmentary perspective view.

The drawings above briefly described, illustrate the preferred form of our invention and while the construction shown has been specifically described, it is to be understood that within the scope of the invention as claimed, modifications may be made.

The numeral 1 designates an elongated runner having opposed flat sides disposed vertically. A suitably shaped metal shoe 2 is secured to the lower edge of the runner 1 and projects laterally therefrom to extend under the tire T of an automobile wheel W, to which the runner is applied. A metal strip 3 preferably extends longitudinally under the intermediate portion of the shoe 2 to prevent lateral slippage of the latter on the snow, and vertical bolts 4 may well pass through the runner, shoe and strip, as shown in Fig. 3. Additional bolts 5 have been shown passing through the ends of the shoe 2 and the runner 1. The heads of all the bolts are countersunk.

Secured against one side of the runner 1, is a flat plate 6 preferably formed of wood, said plate being adapted to contact against the felly F and spokes S, at one side of the wheel W and having an arcuate edge 7 which is intended to abut one of the usual laterally extending portions of the wheel rim R, as disclosed in Figs. 2 and 4.

Spaced outwardly from the plate 6, is a similar plate 8 to contact with the outer side of the wheel felly and spokes, said plate 8 having a curved edge 9 to abut the outwardly projecting portion of the wheel rim, as will be clear from Figs. 1, 2 and 4. A clamping bolt 10 passes through the runner 1, and through the plates 6 and 8, and is preferably provided with a lever nut 11 at its outer end. When the attachment is properly positioned on the wheel and the nut 11 is tightened, the device will be securely clamped in place.

Preferably used in connection with the details above described, is a segmental block 12 secured to the plate 6 for reception between two of the spokes S, said block having a convex edge 13 to abut the inner side of the felly F. This block is preferably disposed centrally and the bolt 10 is shown passing therethrough.

It will be seen from the foregoing that the device is exceptionally simple and inexpensive, yet that it will be highly efficient and deisrable, it being a quick and easy matter to either apply or remove the attachment.

As excellent results have been obtained from the details disclosed, they are preferably followed, but within the scope of the invention as claimed, numerous minor changes may be made.

We claim:

1. A runner attachment comprising a pair of flat clamping members adapted to contact with opposite sides of the spokes and felly of an automobile wheel, said members having curved edges to engage the portions of the usual rim which project laterally from the felly, means for clamping said members against the spokes and felly, and a runner having a portion disposed under said members, said runner being secured to one of said members and being adapted to extend under the wheel tire.

2. A structure as specified in claim 1; together with a segmental block between said members for reception between two spokes of the wheel.

3. A runner attachment comprising a runner having flat sides disposed vertically, a flat plate secured to one side of said runner to contact with the felly and spokes at one side of an automobile wheel, said plate having an arcuate outer edge, a second similarly shaped plate parallel with the first named plate and adapted for contact with the side of the wheel opposite the same, and a clamping bolt passing through the two plates and the runner, said runner having a shoe which projects laterally therefrom to extend under the wheel tire.

4. A structure as specified in claim 3; together with a segmental block between the two plates and secured to the first named plate, said block being receivable between two spokes of the wheel.

In testimony whereof we have hereunto affixed our signatures.

HENRY PAUL GHENT.
LOUIS HANTKE.